(12) United States Patent
Cho et al.

(10) Patent No.: US 10,759,664 B2
(45) Date of Patent: Sep. 1, 2020

(54) MANUFACTURING METHOD OF SILICON CARBIDE AND SILICON CARBIDE MANUFACTURED USING THE SAME

(71) Applicant: KOREA INSTITUTE OF ENERGY RESEARCH, Daejeon (KR)

(72) Inventors: Won Chul Cho, Daejeon (KR); Myung Won Seo, Daejeon (KR); Hae In Lee, Busan (KR); Jae Goo Lee, Daejeon (KR); Ki Kwang Bae, Sejong-si (KR); Chang Hee Kim, Daejeon (KR); Jong Won Kim, Daejeon (KR); Chu Sik Park, Daejeon (KR); Kyoung-Soo Kang, Daejeon (KR); Seong Uk Jeong, Daejeon (KR); Hyun Seok Cho, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/855,246

(22) Filed: Dec. 27, 2017

(65) Prior Publication Data

US 2018/0179071 A1    Jun. 28, 2018

(30) Foreign Application Priority Data

Dec. 27, 2016   (KR) .................. 10-2016-0179893

(51) Int. Cl.
| | | |
|---|---|---|
| *C01B 32/97* | (2017.01) | |
| *C01B 32/963* | (2017.01) | |
| *C01F 5/00* | (2006.01) | |
| *C01F 5/04* | (2006.01) | |
| *C01F 5/02* | (2006.01) | |
| *C01B 33/22* | (2006.01) | |
| *C01B 33/06* | (2006.01) | |

(52) U.S. Cl.
CPC ............ *C01B 32/97* (2017.08); *C01B 32/963* (2017.08); *C01B 33/22* (2013.01); *C01F 5/00* (2013.01); *C01F 5/02* (2013.01); *C01F 5/04* (2013.01); *C01B 33/06* (2013.01); *C01P 2006/12* (2013.01); *C01P 2006/14* (2013.01); *C01P 2006/16* (2013.01); *C01P 2006/44* (2013.01)

(58) Field of Classification Search
None
See application file for complete search history.

(56) References Cited

U.S. PATENT DOCUMENTS

| | | | | |
|---|---|---|---|---|
| 2011/0175024 | A1* | 7/2011 | Lang ................... | C04B 35/565 |
| | | | | 252/182.32 |
| 2011/0250117 | A1* | 10/2011 | Tsai ..................... | C01B 32/956 |
| | | | | 423/345 |

FOREIGN PATENT DOCUMENTS

| | | |
|---|---|---|
| JP | 2011219345 A | 11/2011 |
| KR | 1020100090377 A | 8/2010 |

(Continued)

OTHER PUBLICATIONS

Subrahmanyam et al.; Formation of SiC from Rice Husk Silica-Carbon Black Mixture: Effect of Rapid Heating; Ceramics International; 22, 489-492; 1996.*

(Continued)

*Primary Examiner* — Guinever S Gregorio
(74) *Attorney, Agent, or Firm* — Cantor Colburn LLP

(57) ABSTRACT

A method of preparing silicon carbide according to the present invention includes reacting a silicon-containing compound with carbon dioxide, wherein a reducing agent is optionally used.

7 Claims, 14 Drawing Sheets

(56) References Cited

FOREIGN PATENT DOCUMENTS

KR    1020110063040 A    6/2011
KR    1020130071451 A    6/2013

OTHER PUBLICATIONS

Mukasyan; Combustion Synthesis of Silicon Carbide, Properties and Applications of Silicon Carbide; InTech, http://www.intechopen.com/books/properties-and-applications-of-silicon-carbide/combustion-synthesis-of-silicon-carbide; published online Apr. 2011.*
Translation of CN102211771 provided by ip.conn Apr. 25, 2020.*
"An Investigation on the Processing of SiC by Magnesiothermic Process", 18th International Metallurgy & Materials Congress, Proceedings Book, UCTEA Chamber of Metallurgical & Materials Engineers, Sep. 2016, pp. 106-109.
Korean Office Action for corresponding Korean Patent Application No. 10-2016-0179893 dated Sep. 17, 2017.

* cited by examiner a. 1step  producing Mg$_2$Si b. 2step  producing SiC

β – SiC
( 1 1 1 ) d = 2.5164A
( 2 2 0 ) d = 1.5409A

MANUFACTURING METHOD OF SILICON CARBIDE AND SILICON CARBIDE MANUFACTURED USING THE SAME

BACKGROUND

1. Technical Field

The present invention relates to a method of preparing silicon carbide and silicon carbide prepared using the same.

2. Description of Related Art

Silicon carbide (SiC) has recently been used as a semiconductor material for a variety of electronic devices and purposes. In particular, silicon carbide has high physical strength and high resistance to chemical attacks due to Si—C binding energy, and thus is useful. In addition, silicon carbide has excellent electronic properties including radiation hardness, high breakdown field, relatively wide band-gap, high saturated electron drift velocity, high operating temperature, and the absorption and emission of high-energy quantums in blue, violet, and ultraviolet regions of the spectrum, and thus is applied to various applications such as catalyst supports, filters, structural reinforcing materials, and the like. Recently, research on the application of silicon carbide to solar cells, nanocomposite anodes of lithium ion batteries, silicon nanocrystal matrixes of photovoltaic devices, and the like has been conducted. In particular, β-SiC has a high electron saturation velocity because of a decrease in scattering of phonons due to high symmetry thereof, and, while α-SiC has low sinterability and high crystallinity, porous β-SiC powder has a porous structure, and thus is easily processed and easily applied in compact and complicated shapes, thus receiving attention.

Meanwhile, the silicon carbide powder is prepared by mixing raw materials such as a silicon source, a carbon source, and the like and then heating the resulting mixture. Representative examples of silicon carbide powder preparation methods include an Acheson method, a carbothermal reduction method, a synthesis method using gas phase reaction, a liquid phase polymer reaction method, and the like. In general preparation of silicon carbide, a high-temperature and high-temperature synthesis reaction has been used, and thus manufacturing processes require high manufacturing costs, problems related to safety occur, and the above synthesis method is less economical.

In particular, a case in which silicon carbide is prepared using a general preparation method such as an Acheson method, α-SiC is mostly produced due to a high manufacturing temperature, and thus has limitations in being applied to various application fields due to low sinterability thereof. In addition, when a reaction proceeds at a temperature of 1,400° C. to 1,700° C. to produce β-silicon carbide, the reaction rate is slow and carbon is easily sintered for a long period of reaction time and at high temperatures even though activated carbon, carbon black, or the like with a high specific surface area (300 $m^2$/g or more), which is used as a carbon raw material, is used, and thus β-silicon carbide with a low specific surface area (10 $m^2$/g or less) is produced.

To address this, a method of producing silicon carbide using a colloid-based solution using tetraethoxysilane (TEOS) and a material such as a phenolic resin, vinyl polysilane, poly(silylenemethylene), tetrakis(ethylamino) silane, or triethylsilane as starting materials has been attempted, but yield is low (<50%) and specific conditions such as complicated equipment, complicated manufacturing processes, and high-temperature and/or vacuum conditions are required, and, in particular, silane-based compounds are highly harmful and are also expensive.

Therefore, there is a need to develop a method of preparing silicon carbide by which porous silicon carbide can be effectively prepared.

(Related Document) Korean Patent Publication No. 2011-0063040 (Jun. 10, 2011).

SUMMARY

1. Technical Problem

The present invention has been made in view of the above problems, and it is one object of the present invention to provide a method of preparing silicon carbide in which silicon carbide may be effectively prepared only under a room temperature condition and by reaction in the presence of carbon dioxide unlike conventional techniques.

Another object of the present invention is to provide silicon carbide prepared using the above-described method and having a high specific surface area.

2. Solution to Problem

An embodiment of the present invention provides a method of preparing silicon carbide, including reacting a silicon-containing compound with carbon dioxide, wherein a reducing agent is optionally used.

Another embodiment of the present invention provides silicon carbide prepared using the above-described method.

3. Advantageous Effects

According to the present invention, a high yield of silicon carbide can be effectively prepared only under a room temperature condition and by reaction in the presence of carbon dioxide.

Meanwhile, silicon carbide is prepared using carbon dioxide, which is a cause of the greenhouse effect, and thus carbon dioxide is effectively reduced.

The silicon carbide according to the present invention has a specific surface area of 30 $m^2$/g or more and a ratio of the α-SiC phase to the β-SiC phase that can be easily adjusted through a heat scavenger, and thus can be used in various application fields.

DETAILED DESCRIPTION OF EMBODIMENTS

Hereinafter, the present invention will be described in detail.

An embodiment of the present invention relates to a method of preparing silicon carbide, including reacting a silicon-containing compound with carbon dioxide, wherein a reducing agent is optionally used.

Preparation of Silicon Carbide

Silicon carbide according to the present invention may be prepared by reacting a silicon-containing compound with carbon dioxide, and at this time, a reducing agent may be optionally used.

The term "silicon-containing compound" as used herein refers to a compound containing silicon atoms and may include silicon dioxide ($SiO_2$), Si, a silicon metal such as $Mg_2Si$, and the like.

The reducing agent may be any one of sodium (Na), magnesium (Mg), calcium (Ca), potassium (K), manganese (Mn), iron (Fe), boron (B), aluminum (Al), titanium (Ti), and phosphorus (P), or a mixture thereof, but the present invention is not limited thereto. In particular, the reducing agent may be magnesium, but the present invention is not limited thereto.

The reducing agent may be added in an amount of 0.7 equivalent to 1.5 equivalents with respect to 1 equivalent of the silicon-containing compound, but the present invention is also not limited thereto.

In one embodiment of the present invention, the reacting process may be represented by Reaction Scheme 1 below:

$$4Mg+SiO_2+CO_2(g) \rightarrow 4MgO+SiC \quad \text{[Reaction Scheme 1]}$$

Figure 1:
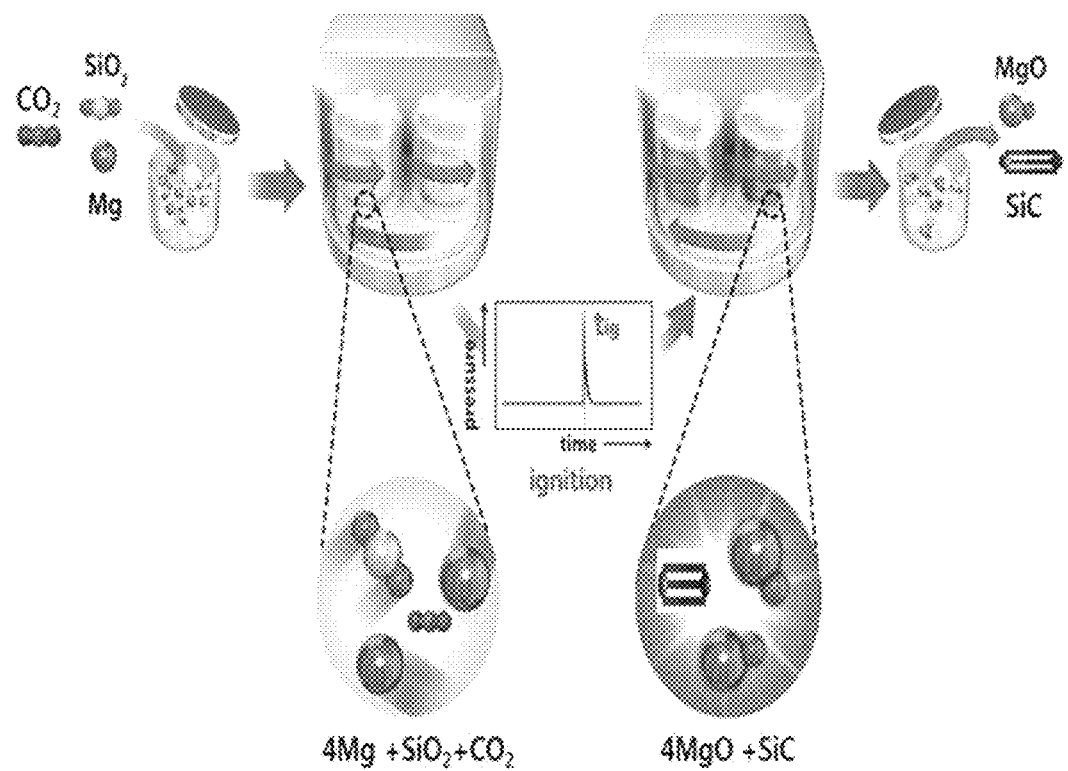
FIG. 1 is a view illustrating a method of preparing silicon carbide, according to an embodiment of the present invention.

FIG. 1 illustrates a method of preparing silicon carbide, according to an embodiment of the present invention. In particular, silica powder, magnesium powder, and $CO_2$ are put in a ball mill device and allowed to react for a certain period of time, thereby obtaining silicon carbide. The $CO_2$ may be injected in the form of gas, or may be added to the ball mill device in the form of dry ice. Meanwhile, the prepared silicon carbide may be in the form of fine powder.

In particular, in the reacting process, as carbon dioxide ($CO_2$), carbon dioxide ($CO_2$) generated as a by-product in conventional iron or cement manufacturing processes may be used, and solid dry ice may also be used. For example, when carbon dioxide as the by-product is used, the emission of carbon dioxide ($CO_2$) in iron or cement manufacturing processes may be reduced, and the manufacturing processes may be economical.

In another embodiment of the present invention, the reacting process may be a two-stage reaction represented by Reaction Scheme 2 below:

$$\text{First stage: } 4Mg+SiO_2 \rightarrow Mg_2Si+2MgO$$

$$\text{Second stage: } Mg_2Si+2MgO+CO_2(g) \rightarrow 4MgO+SiC \quad \text{[Reaction Scheme 2]}$$

When the method of preparing silicon carbide, according to the present invention, is performed by the two-stage reaction of Reaction Scheme 2, it is advantageous in that the yield of silicon, which is a by-product, may be reduced. In the case of the one-stage reaction represented by Reaction Scheme 1, silicon may be synthesized by reacting magnesium with silica, and thus the yield of silicon carbide may be relatively slightly reduced, while, in the case of the two-stage reaction represented by Reaction Scheme 2, first, magnesium is allowed to react with silica to form $Mg_2Si$, which is an intermediate, which is then allowed to react with carbon dioxide, thereby suppressing the synthesis of silicon, and thus it is advantageous in that yield and purity of the prepared silicon carbide may be increased.

In another embodiment of the present invention, the reacting of the silicon-containing compound with carbon dioxide may be represented by Reaction Scheme 3 below:

$$Mg_2Si+2MgO+CO_2(g) \rightarrow 4MgO+SiC \quad \text{[Reaction Scheme 3]}$$

In particular, silicon carbide may be prepared by reacting $Mg_2Si$ as a starting material, which is an intermediate, prepared through the first stage reaction of Reaction Scheme 2, with carbon dioxide, and, at this time, as the $Mg_2Si$, commercially available $Mg_2Si$ may be used or $Mg_2Si$ prepared as an intermediate as in the first stage reaction of Reaction Scheme 2 may also be used.

In another embodiment of the present invention, the silicon-containing compound may be amorphous silica ($SiO_2$).

Silica is one of the most common raw materials on earth, and, in particular, may be obtained from minerals or plants.

First, silica derived from a mineral such as sand or the like may be obtained through gasification, extraction, or the like, followed by washing and separation, to be used as a raw material. Meanwhile, the mineral-derived silica generally corresponds to non-porous crystalline silica.

Meanwhile, silica derived from a plant such as rice, wheat, bamboo, barley, corn, soybean, or the like may be collected from a plant, and, since the silica includes an organic material mixed as an impurity, the silica may be used after removing the organic material by performing heat treatment (heat combustion) or acid treatment on an ash-type material obtained by primarily heat-treating the silica. Meanwhile, in the case of the plant-derived silica, relatively hard silica is formed in a plant body as a structure for protection thereof, and has a unique porous, non-crystalline structure, and thus may be applied to a variety of fields.

When the silicon-containing compound is amorphous silica, silicon carbide is more easily prepared compared to when crystalline silica is used, and it is advantageous in that silicon carbide having a high content of β-SiC may be prepared. As the amorphous silica, commercially available amorphous silica may be used, or directly synthesized amorphous silica may also be used.

In another embodiment of the present invention, the amorphous silica may be chaff-derived silica. The chaff-derived silica is a plant-derived material in which comparatively hard silica is formed in a plant body as a structure for protection thereof, and has porosity, and thus, when used to prepare the silicon carbide according to the present invention, silicon carbide with a high specific surface area may be prepared.

The chaff-derived silica, which is a plant-derived material, includes an organic material as an impurity as described above, and thus may be used after removing the organic material through heat treatment (heat combustion) or acid treatment of an ash-type material obtained by primarily heat-treating the chaff-derived silica, but the present invention is not limited thereto. The present invention is not limited to the heat treatment or the acid treatment, and methods commonly used in the art may be used.

In another embodiment of the present invention, the reacting of the silicon-containing compound with carbon dioxide may be performed at a temperature of 1,400° C. to 1,700° C.

When the reacting of the silicon-containing compound with carbon dioxide is performed in a milling machine, the temperature may be a temperature inside the milling machine.

When porous β-SiC is prepared using a conventionally used method such as an Acheson method represented by Reaction Scheme 4 below, a reaction occurs at 1,400° C. to 1,700° C. In this regard, the reaction is a solid-solid diffusion reaction between silicon oxide and solid carbon, and thus the reaction rate is slow and the solid carbon is rapidly sintered at 1,300° C. to 1,700° C., and, accordingly, the prepared β-silicon carbide has a small specific surface area, i.e., 10 m²/g or less.

$SiO_2(s)+3C(s) \rightarrow SiC(s)+2CO(g)$ [Reaction Scheme 4]

However, the method of preparing silicon carbide according to the present invention uses carbon dioxide gas as a carbon source, and thus a reaction rate of the solid-gas diffusion reaction is relatively fast, and sintering of carbon does not occur, which enables the preparation of silicon carbide having high porosity and a large surface area, resulting in excellent processability, and thus the silicon carbide may be manufactured as a complicated engineering structure and, accordingly, may be applied to a variety of fields including filters (a diesel engine dust filter, dust filters for heat exchangers and power plants, and filters for casting), catalyst supports, or special applications such as high-temperature lightweight structural materials, kiln furniture for high temperature furnaces, bulletproof materials, shock absorbers, preforms for composite materials, and the like.

In another embodiment of the present invention, silicon carbide prepared using the method of preparing silicon carbide may have a yield of 90% or more.

When a conventional silicon carbide preparation method is used, CO gas is generated together with the prepared silicon carbide, and thus the prepared silicon carbide has a very low yield, i.e., 60% to 70%.

However, when the method of preparing silicon carbide according to the present invention is used, a gas by-product is not generated and the reaction is a solid-gas diffusion reaction, and thus it is possible to prepare silicon carbide with a yield of 90% or more, in particular, 95% or more.

In another embodiment of the present invention, the method may be performed by further including a heat scavenger. The heat scavenger may be at least one selected from the group consisting of NaCl and polymer materials such as Licowax, but the present invention is not limited thereto. In particular, the heat scavenger may be NaCl.

The heat scavenger may be added to the reacting of the silicon-containing compound with carbon dioxide, and, when the heat scavenger is added, the heat scavenger absorbs reaction heat generated inside a milling machine, and thus it is possible to adjust the selectivity of α-SiC produced at a high temperature, i.e., 1,700° C. or more and β-SiC produced at a temperature of 1,400° C. to 1,700° C.

In particular, as the amount of heat scavenger added to the above process increases, the proportion of β-SiC in the prepared silicon carbide becomes relatively high. The heat scavenger may be added in an amount of 30 wt % to 150 wt % with respect to the weight of $SiO_2$ or $Mg_2Si$, but the present invention is not limited thereto.

In another embodiment of the present invention, the method may further include post-treating the silicon carbide prepared using the method of preparing silicon carbide. In particular, since the method of preparing silicon carbide of the present invention further includes the post-treating process after the reacting of the silicon-containing compound with carbon dioxide, the yield of finally obtained silicon carbide may be increased.

The post-treating process may be one or more selected from the group consisting of an acid treatment process and a NaOH treatment process.

In particular, the post-treating of the prepared silicon carbide may include performing NaOH treatment after acid treatment.

The acid treatment process is performed to remove an oxide such as MgO or the like, and the present invention is not limited to this acid treatment process. For example, the acid treatment process may be performed by stirring the prepared silicon carbide and an acid treatment solution prepared by mixing distilled water, an alcohol such as ethanol, and an acid such as HCl for 1 hour to 5 hours.

The NaOH treatment process is performed to remove a by-product such as Si or the like, and the present invention is also not limited to this NaOH treatment method. For example, the NaOH treatment process may be performed by stirring the prepared silicon carbide together with a NaOH solution prepared by mixing distilled water and NaOH for 1 hour to 24 hours.

Meanwhile, the reacting of the silicon-containing compound with carbon dioxide may be performed using a ball mill machine, but the present invention is not limited thereto.

The ball mill machine may be, for example, a high-energy ball milling machine, and examples thereof include a vibratory/shaker mill, a planetary mill, an attrition mill, and the like.

In particular, when a high-energy ball mill machine is operated for a certain set period of time after charging milling balls and raw material powder in the machine, a reaction occurs inside the machine, thereby preparing fine powder-type silicon carbide.

In particular, a material for the milling balls may be alloy steel, hardened steel, heat-treated steel, zirconia, alumina, agate, or the like, but is not particularly limited.

Meanwhile, the milling process may be performed under pressurized conditions, for example, under a pressurization condition of 1 bar to 10 bar. The reaction of Reaction Scheme 1 is an exothermic reaction, but the activation energy is very high, and thus, to overcome this, a process of increasing a driving force through a temperature increase or a process of increasing a driving force by increasing a pressure in a reactor is required, and it is preferred to increase a driving force by increasing a pressure inside a reactor.

Meanwhile, the milling process may be performed under a room-temperature condition, and the room temperature or normal temperature condition as used in the specification of the present invention refers to a temperature range between 20° C. and 25° C. That is, unlike conventional techniques, the method of preparing silicon carbide according to the present invention may be performed under a room temperature condition, and thus manufacturing costs are low, safety is high, and it is highly economical.

The milling process may be performed in an inert gas atmosphere such as an argon gas atmosphere, but the present invention is not limited thereto.

The method of preparing silicon carbide according to the present invention may enable porous silicon carbide having a high content of β-SiC and a large specific surface area to be prepared, and it is advantageous in that a high yield of silicon carbide may be prepared through mass production.

Silicon Carbide

Another embodiment of the present invention relates to silicon carbide prepared using the above-described method of preparing silicon carbide. Referring to Table 1 and FIG. 8, the silicon carbide according to the present invention has a large specific surface area and meso-pores (between 2 nm and 50 nm). In addition, the method of preparing silicon carbide according to the present invention is an excellent process capable of controlling the amounts of α-silicon carbide and β-silicon carbide by adjusting a heat scavenger.

In another embodiment of the present invention, the silicon carbide may include α-silicon carbide and β-silicon carbide.

In another embodiment of the present invention, the amount of β-silicon carbide in the silicon carbide may be 40 wt % or more with respect to the total weight of the silicon carbide. Conventional silicon carbide has a higher content of α-silicon carbide having a compact crystal structure than β-silicon carbide, and thus has slightly deteriorated processability. However, the silicon carbide according to the present invention includes β-silicon carbide in an amount of 40 wt % or more with respect to the total weight of the silicon carbide, and thus has excellent processability. More particularly, 90 wt % or more of β-silicon carbide may be included in the silicon carbide by adjusting the amount of the heat scavenger, and thus, in particular, the silicon carbide has excellent processability.

In another embodiment of the present invention, the silicon carbide may be porous silicon carbide. In particular, the silicon carbide may have a BET surface area of 30 $m^2/g$ or more. More particularly, the silicon carbide according to the present invention may have a BET surface area of 94 $m^2/g$ to 119 $m^2/g$.

In the case of general silicon carbide, even porous silicon carbide uses a solid carbon source, and thus, due to sintering of carbon in a high-temperature preparation process, has a very small specific surface area, i.e., 10 $m^2/g$ or less. However, the silicon carbide according to the present invention uses carbon dioxide gas as a carbon source, and thus it is possible to prepare porous silicon carbide with a very large specific surface area.

The specific surface area may be measured through a specific surface area and pore volume/size analyzer (Tristar II 3020, Micromeritics), and, when the specific surface area is within the above range, it is possible for the silicon carbide to be used as a highly heat-resistant porous catalyst support and a filter, and the silicon carbide has excellent processability, and thus is easily used as an engineering material.

In another embodiment of the present invention, the silicon carbide may have a pore volume of 0.26 $cm^3/g$ or more. The pore volume may be measured through a specific surface area and pore analyzer (Tristar II 3020, Micromeritics), and it is advantageous for the silicon carbide to be used as a highly heat-resistant porous catalyst support and a filter.

In addition, in another embodiment of the present invention, the silicon carbide may have a pore size of 2 nm or more, in particular, 2 nm to 50 nm, and more particularly, 8 nm to 50 nm. The pore size may be an average size (diameter) of pores included in the silicon carbide.

The pore size may be measured through a specific surface area and pore analyzer (Tristar II 3020, Micromeritics), and, when the pore size is within the above ranges, it is advantageous for the silicon carbide to be used as a highly heat-resistant porous catalyst support and a filter.

In another embodiment of the present invention, the silicon carbide may be used in highly heat-resistant porous catalyst supports, filters, and engineering materials. The silicon carbide according to the present invention has excellent physical strength and high resistance to chemical attacks, and thus may be used in a variety of fields. In particular, the silicon carbide has a porous form with a large specific surface area, and thus has excellent processability, and, accordingly, may be applied to complicated engineering apparatuses, more particularly, a variety of fields such as filters (a diesel engine dust filter, dust filters for heat exchangers and power plants, and filters for casting), catalyst supports, or special applications such as high-temperature lightweight structural materials, kiln furniture for high temperature furnaces, bulletproof materials, shock absorbers, preforms for composite materials, and the like.

Hereinafter, the present invention will be described in further detail with reference to the following examples. However, these examples are provided to aid in understanding the present invention and are not intended to limit the scope of the present invention in any sense.

EXAMPLES 1 TO 3

Example 1

8 g of chaff-derived silica ($SiO_2$), 12.94 g of Mg (Sigma Aldrich, assay 99.5%), and 5.86 g of $CO_2$ (dry ice) were put into a 500 ml container (SKD-11) and milled using a milling machine (Pulverisette 5, Fritsch) in an argon gas atmosphere up to ignition time, thereby completing the preparation of silicon carbide. At this time, the RPM was 350, and a ball mass to powder mass ratio (BPR) was 30:1 (WC ball, 15 mm: 300 g, 10 mm: 330 g).

1,600 ml of distilled water, 200 ml of ethanol, and 200 ml of HCl were mixed to prepare an acid treatment solution, and then the prepared silicon carbide was added to the acid treatment solution, followed by stirring at room temperature and 250 rpm for 1 hour, thereby completing primary acid treatment.

The primary acid treatment-completed silicon carbide was filtered using a filter, and then dried in an oven at 80° C., followed by secondary acid treatment using an acid treatment solution prepared by mixing 1,600 ml of distilled water, 200 ml of ethanol, and 200 ml of HCl. At this time, the secondary acid treatment was performed using a sonicator at room temperature for 1 hour.

The secondary acid treatment-completed silicon carbide was filtered using a filter and then dried in an oven at 80° C., and the dried silicon carbide was mixed with NaOH in 2,000 ml of distilled water to satisfy pH 14, followed by stirring at 80° C. and 250 rpm for 1 hour using a magnetic stirrer, filtration using a filter, and drying in an oven at 80° C.

Example 2

Silicon carbide was prepared in the same manner as in Example 1, except that 8 g of silica ($SiO_2$, Sigma Aldrich BET 200) and 12.94 g of Mg (Sigma Aldrich, assay 99.5%) were first milled up to ignition time, and then $CO_2$ was added thereto to allow a second stage reaction to occur therebetween.

Example 3

6 g of silica ($SiO_2$, Sigma Aldrich BET 200) and 9.71 g of Mg (Sigma Aldrich, assay 99.5%) were first subjected to milling up to ignition time, and then $CO_2$ 5 bar (gas) and NaCl as a heat scavenger were added thereto to allow a second stage reaction to occur therebetween, thereby preparing silicon carbide. The used container was a 500 ml container (SKD-11), and the milling process was performed using a milling machine (Pulverisette 5, Fritsch) in an argon gas atmosphere up to ignition time, thereby completing the preparation of silicon carbide. At this time, the RPM was 350, and the BPR was 42:1 (WC ball, 15 mm: 344.7 g, 10 mm: 327.7 g).

At this time, NaCl included in the second stage reaction was added in amounts of 25% (1.92 g), 50% (3.83 g), 75% (5.75 g), and 100% (7.66 g) with respect to the weight of $Mg_2Si$ prepared after the first stage reaction.

Experimental Example

1. X-ray Diffraction (XRD)

Figure 2A:
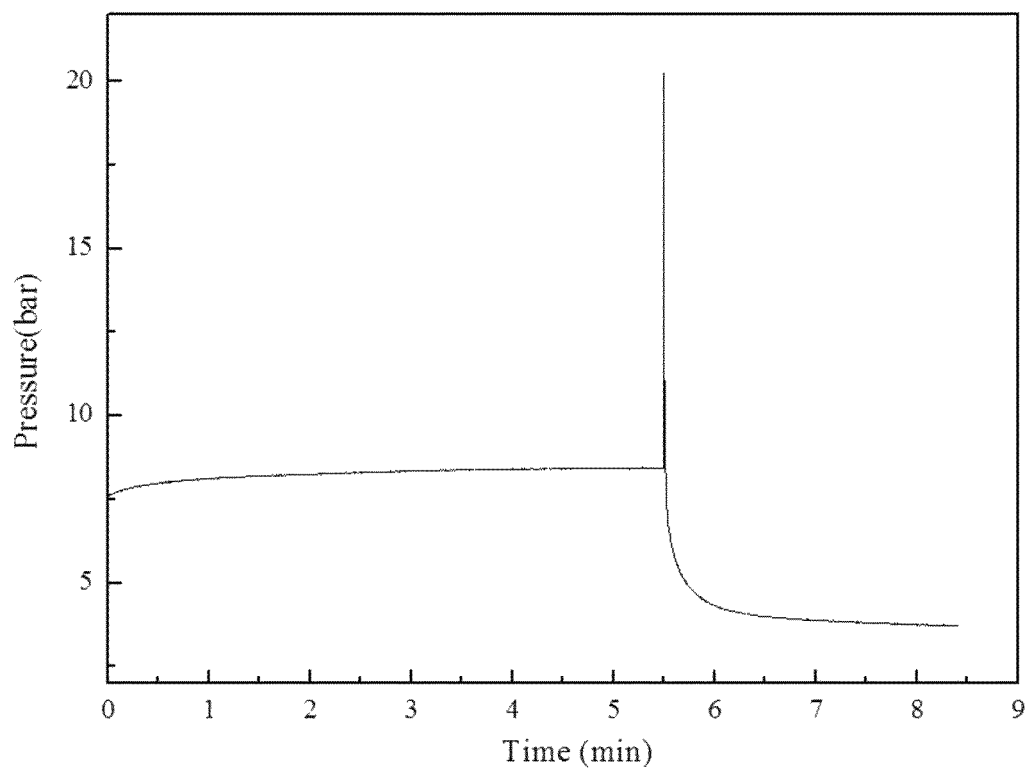
FIGS. 2A to 2D are graphs showing X-ray diffraction (XRD) data according to an embodiment of the present invention.
Figure 2B:
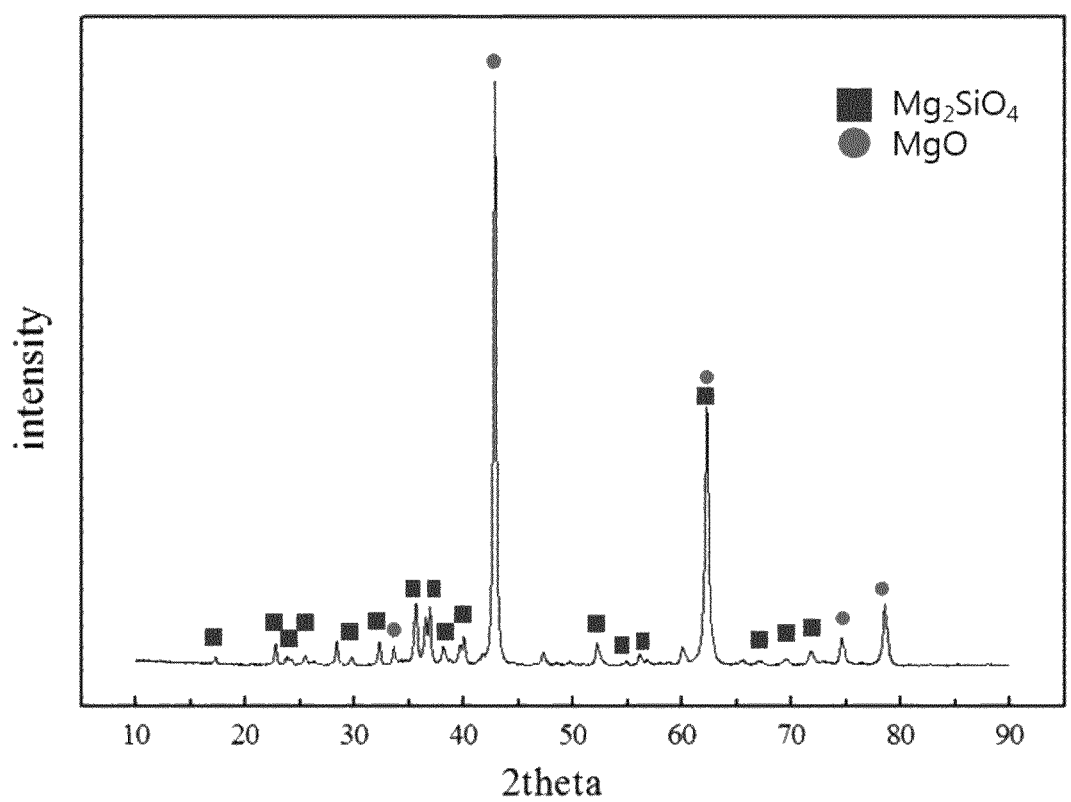
Figure 2C:
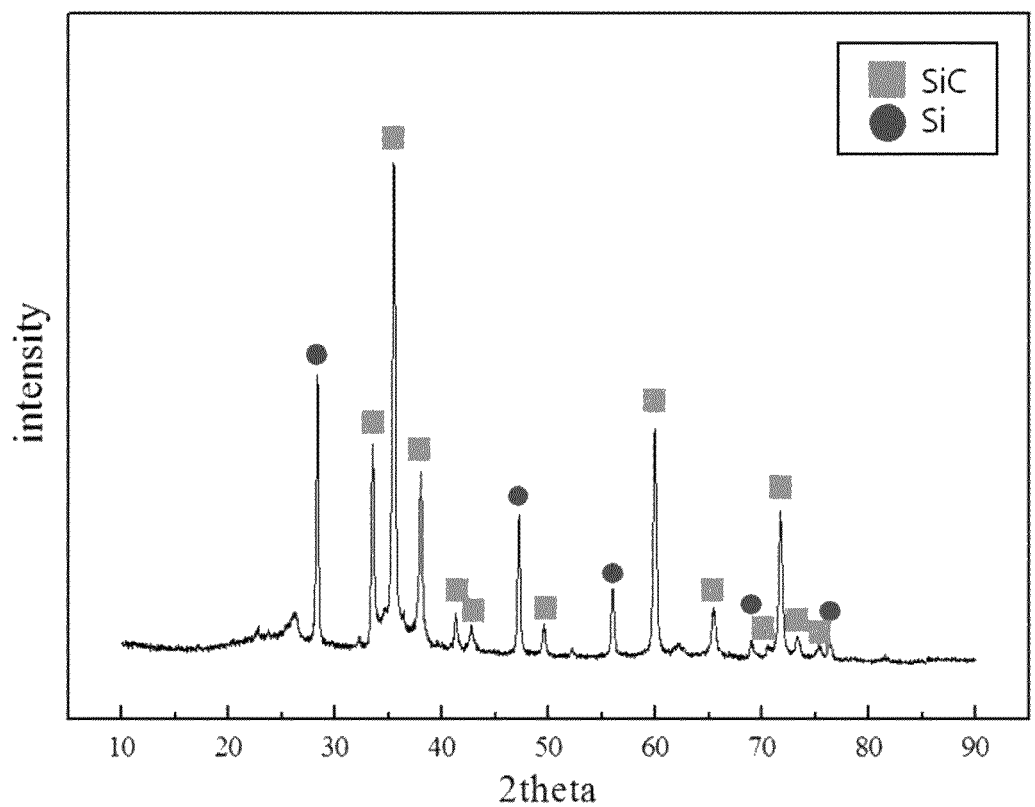
Figure 2D:
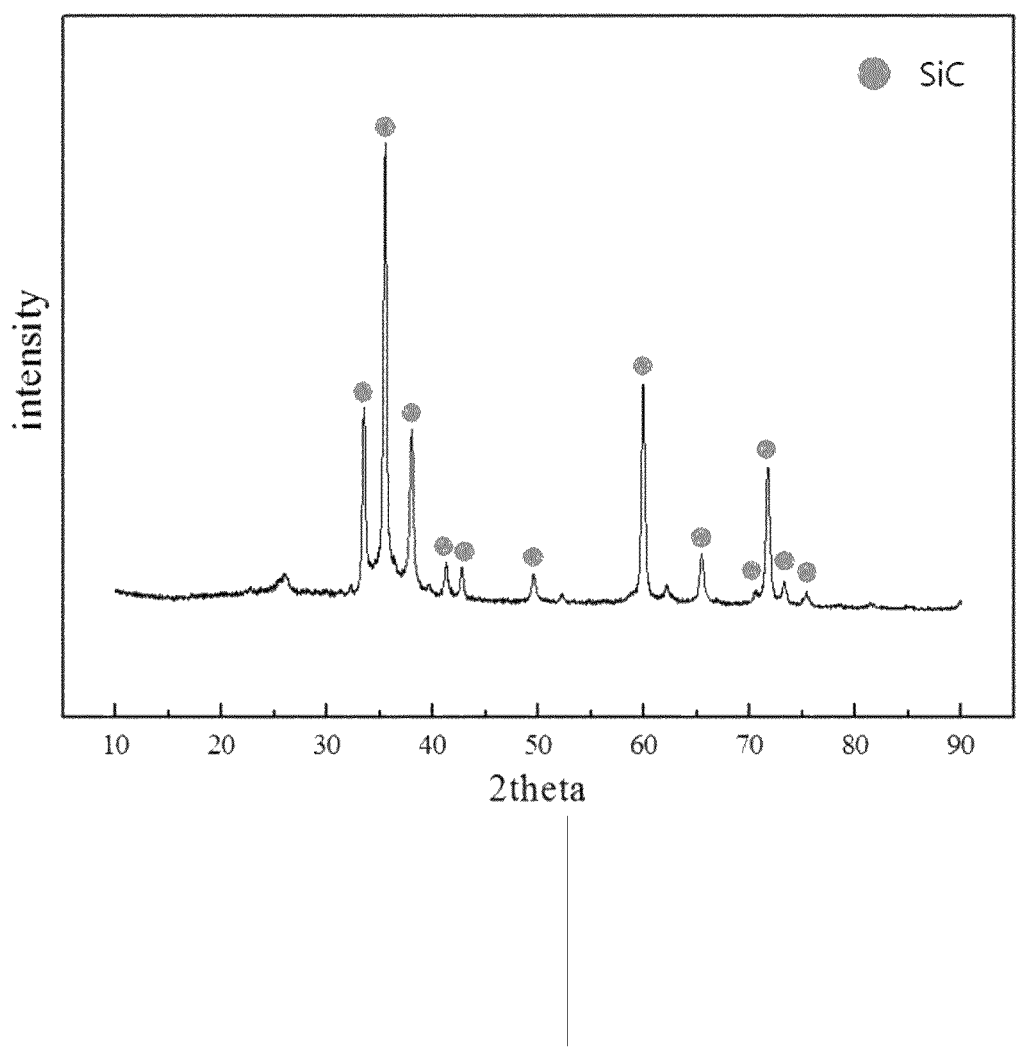
Figure 3A:
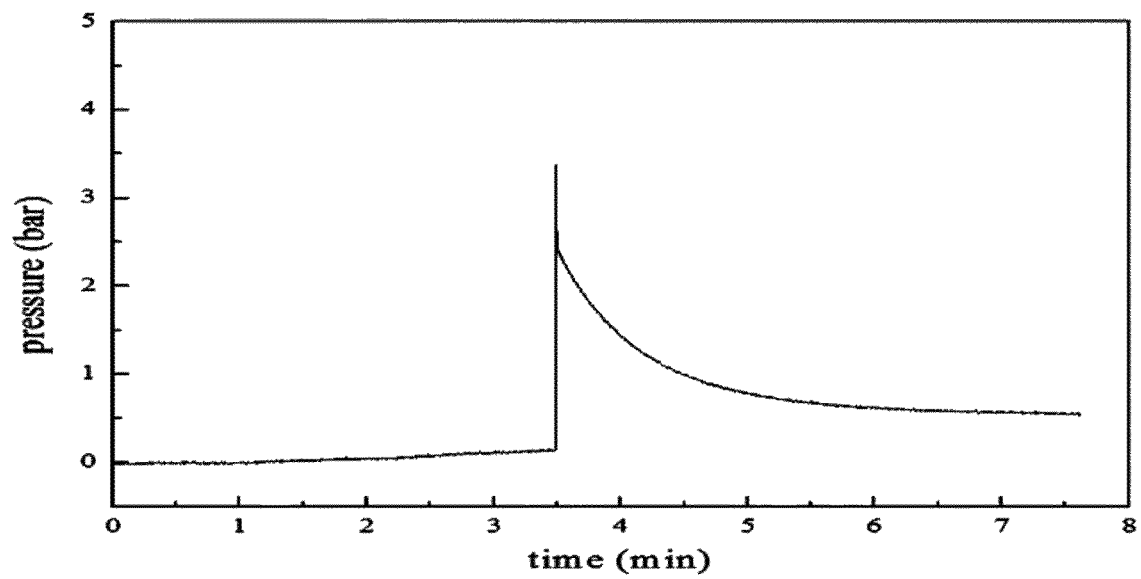
FIGS. 3A to 3E are graphs showing XRD data according to an embodiment of the present invention.
Figure 3A:
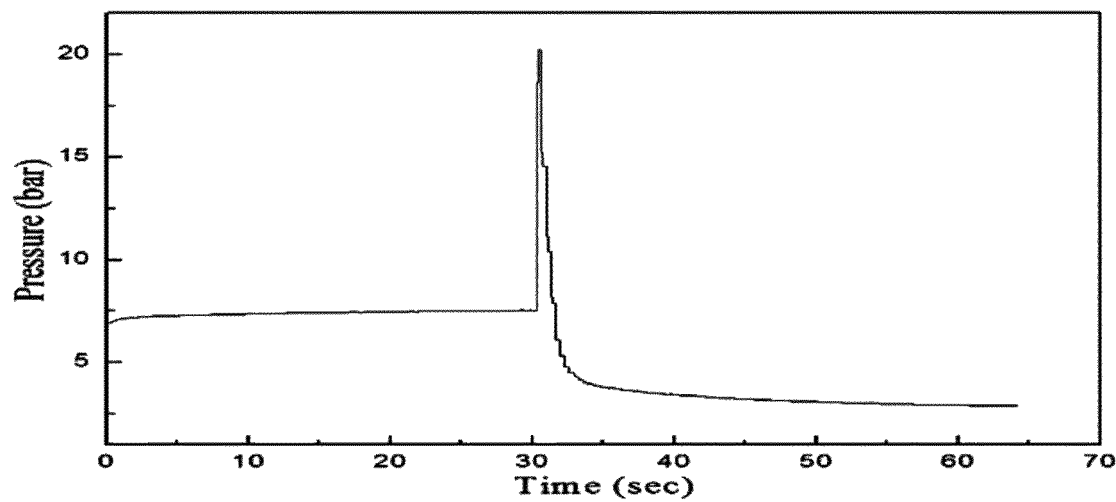

XRD results after reaction (XRD before acid treatment), XRD results after acid treatment, and XRD results after NaOH treatment of the silicon carbide prepared according to Example 1 are illustrated in FIGS. 2B, 2C, and 2D, respectively, and XRD results after a first stage (XRD before acid treatment), XRD results after a second stage (XRD before acid treatment), XRD results after acid treatment, and XRD results after NaOH treatment of the silicon carbide prepared according to Example 2 are illustrated in FIGS. 3B, 3C, 3D, and 3E, respectively. FIGS. 2A and 3A are graphs respectively showing ignition time of the preparation method according to Example 1 and ignition time of the preparation method according to Example 2.

Figure 3B:
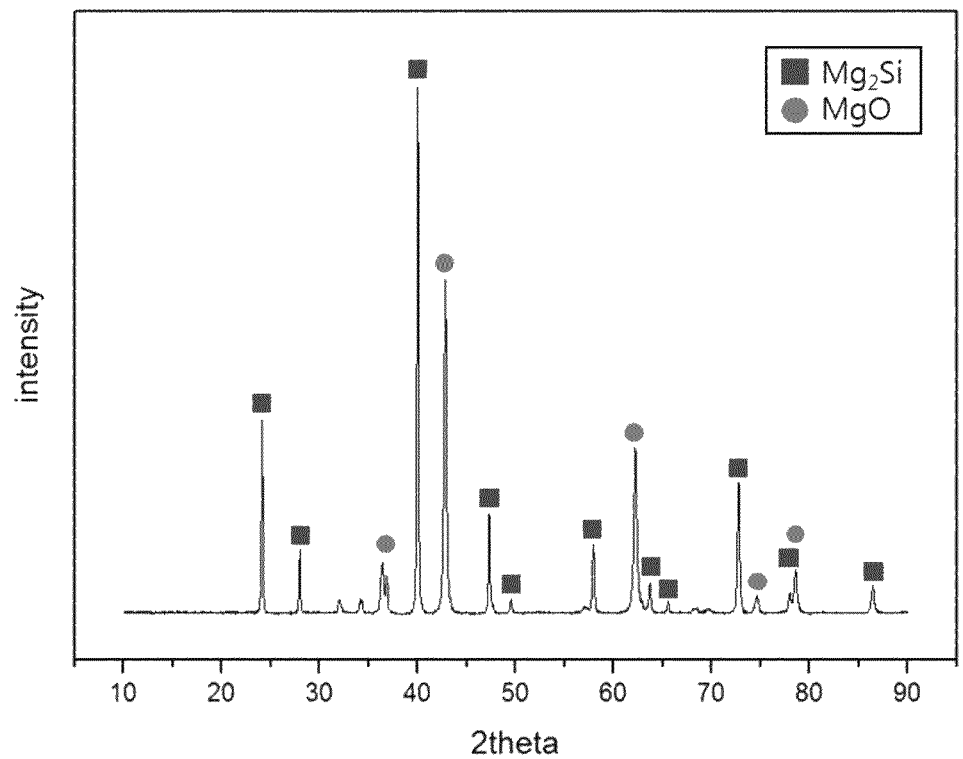
Figure 3C:
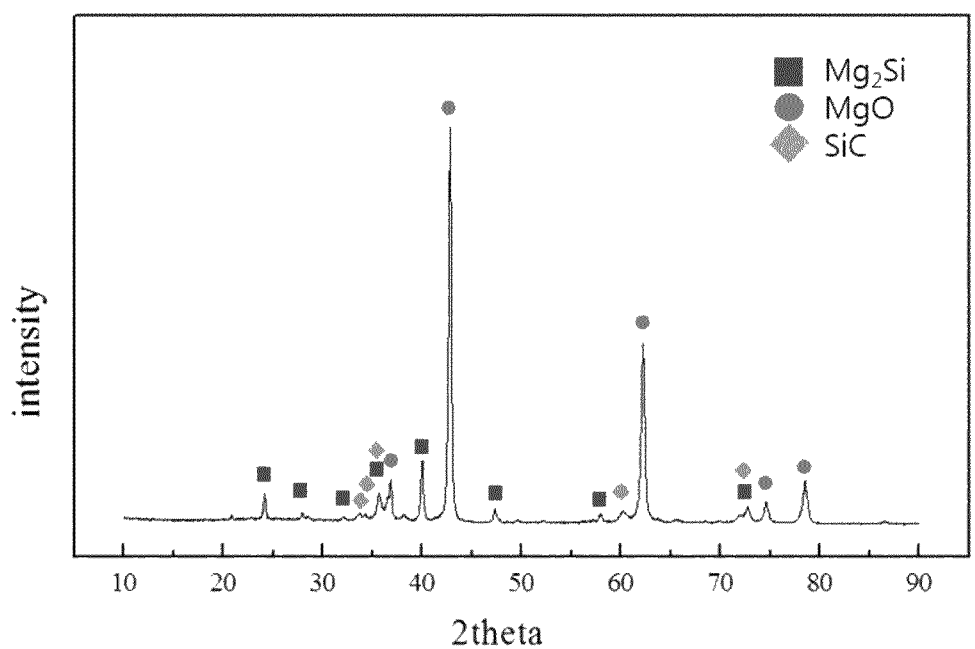
Figure 3D:
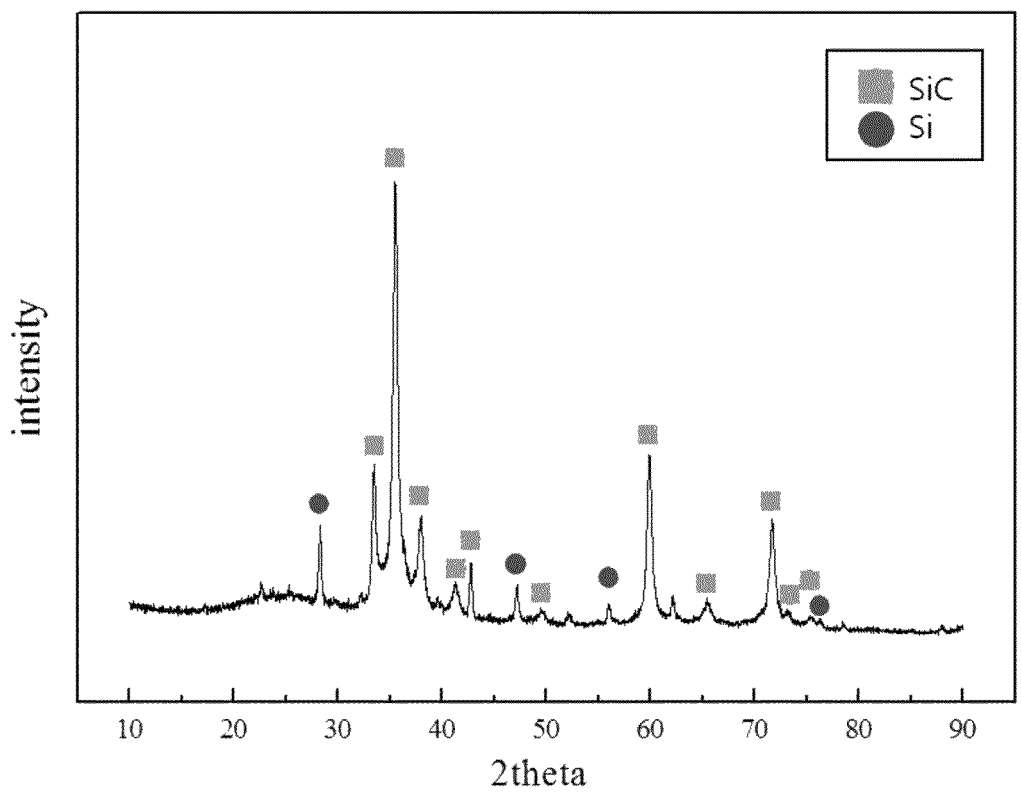
Figure 3E:
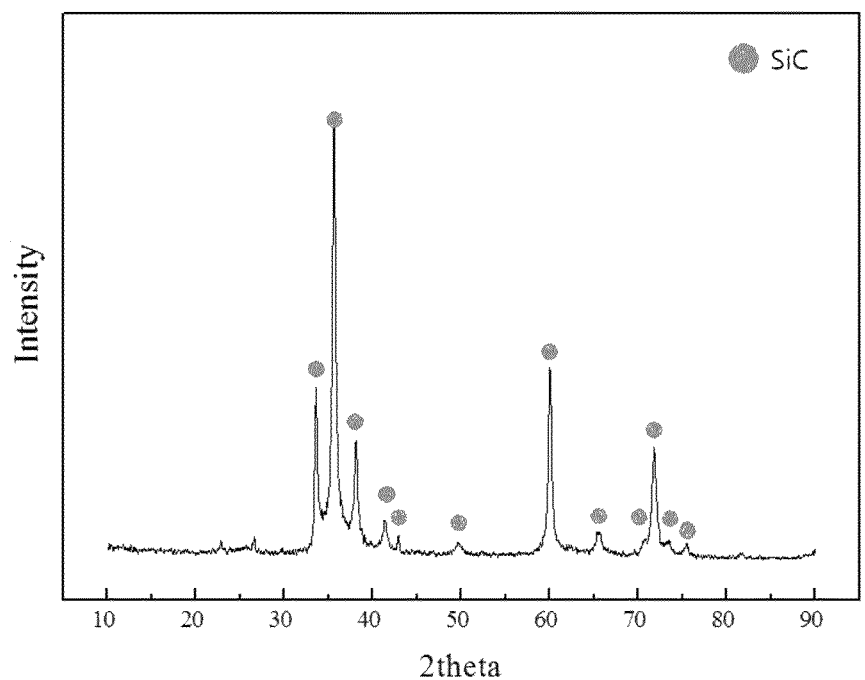

Referring to FIGS. 2B to 2D and 3B to 3E, as illustrated in FIGS. 2B, 3B, and 3C, first, most peaks after reaction appear to be $Mg_2SiO_4$ or MgO, and, as shown in FIGS. 2C and 3D, it can be confirmed that the Mg component is removed after acid treatment and both SiC as a final product and Si as a by-product are generated. In addition, as shown in FIGS. 2D and 3E, it can be confirmed that Si is removed after NaOH treatment, which results in only SiC remained.

Figure 4:
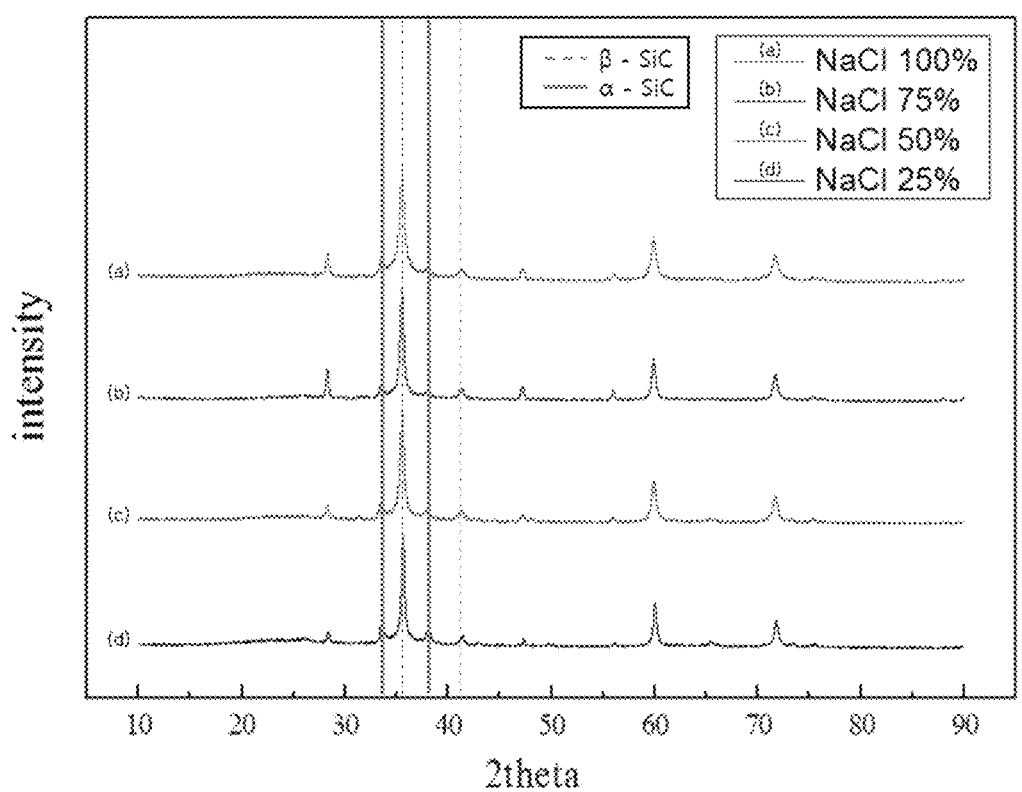
FIG. 4 is a graph showing XRD data according to an embodiment of the present invention.

FIG. 4 illustrates XRD results of the silicon carbide prepared according to Example 3. Referring to FIG. 4, it can be seen that, as the amount of NaCl, which is a heat scavenger, becomes greater, the intensity of a peak corresponding to α-SiC is decreased and the intensity of a peak corresponding to β-SiC is increased. In particular, referring to FIG. 4, it can be seen that, when the amount of NaCl is 100%, the amount of β-SiC is increased to about 46 wt % with respect to the total weight of the silicon carbide, and, more particularly, the amount of β-SiC may be adjusted to be 90 wt % or more by adjusting the amount of the heat scavenger.

2. Transmission Electron Microscopy (TEM)

Figure 5:
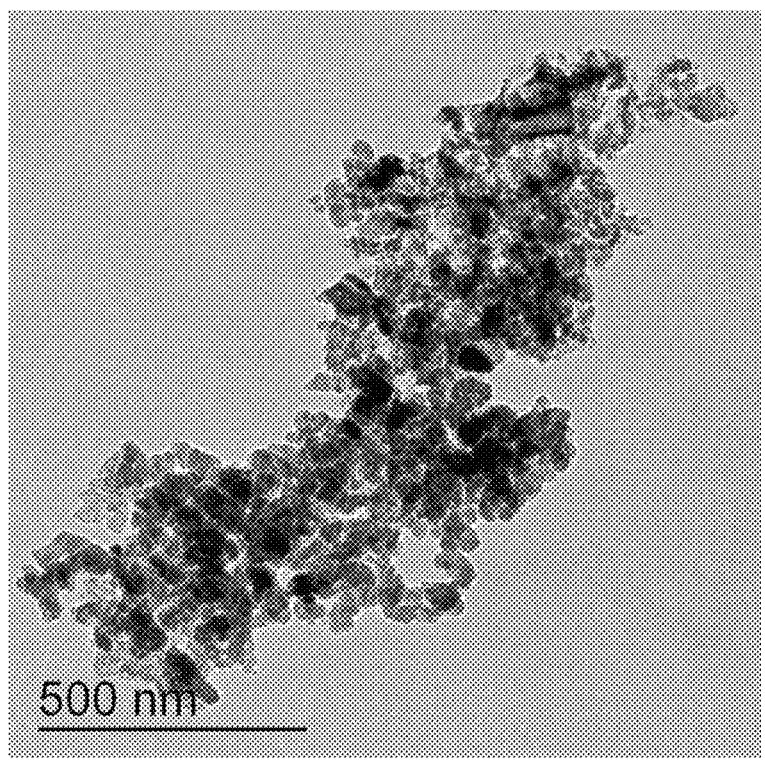
FIGS. 5 and 6 are transmission electron microscope (TEM) images according to an embodiment of the present invention.
Figure 6:
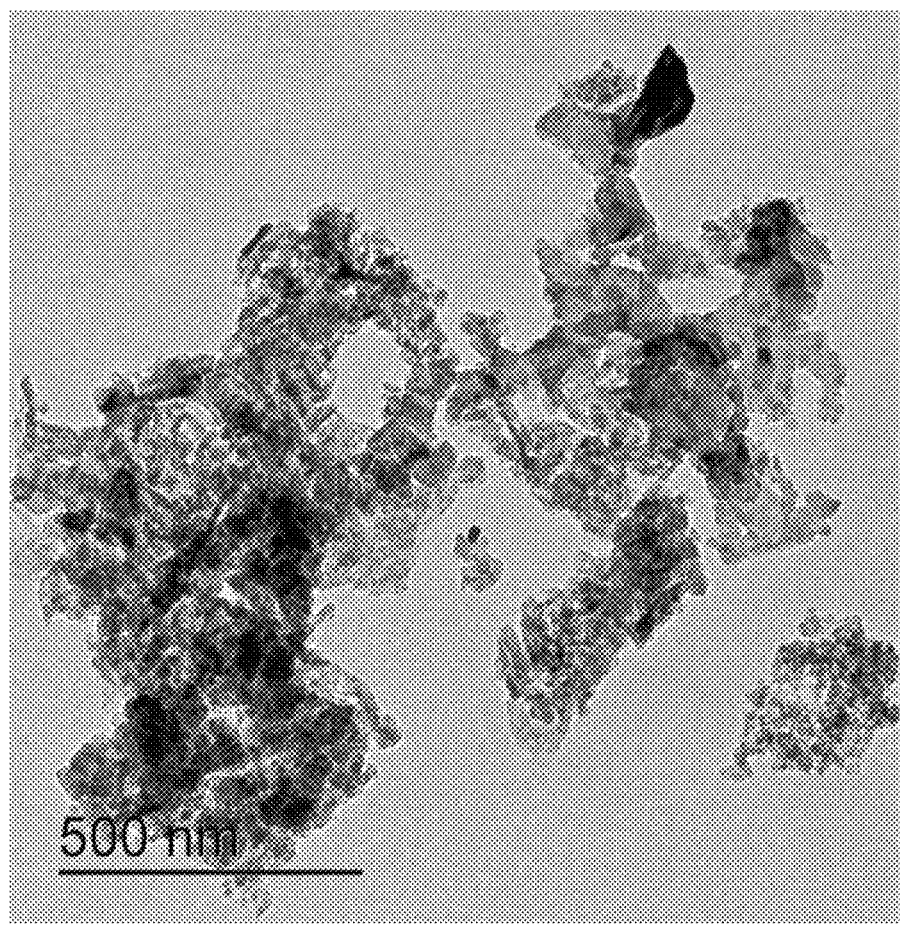

The silicon carbides prepared according to Examples 1 and 2 were observed by TEM (Tecnai G2 F30, FEI), and TEM images are respectively shown in FIGS. 5 and 6.

Referring to FIGS. 5 and 6, it can be seen that three-dimensional porous SiC is produced both in Examples 1 and 2.

Figure 7A:
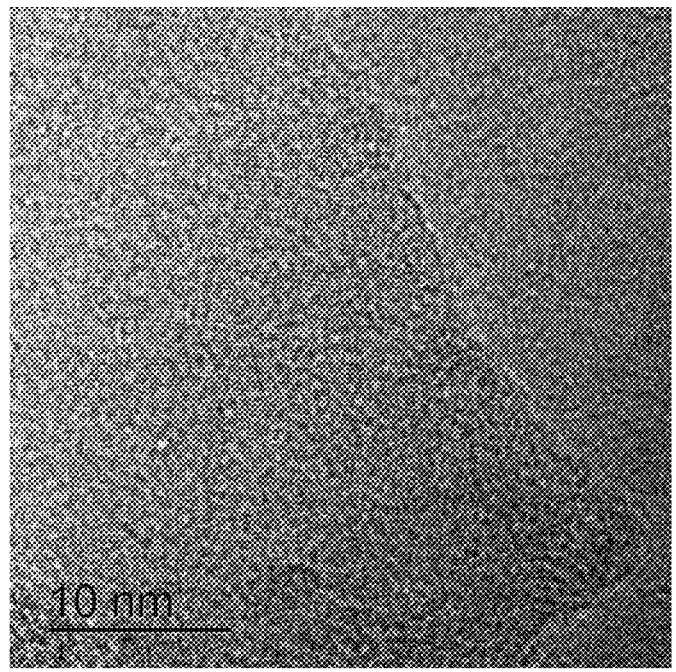
FIGS. 7A and 7B are a TEM image and a Fourier-transformation (FT) image according to an embodiment of the present invention.
Figure 7B:
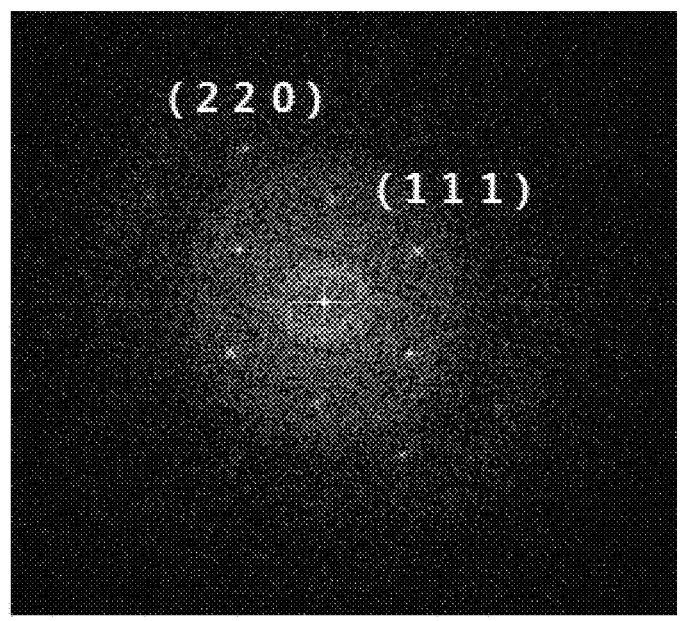

FIG. 7A is a TEM image showing a lattice structure according to Example 2, and FIG. 7B is a Fourier-transformation (FT) image according to FIG. 7A.

Referring to FIG. 7, it can be seen that SiC, in particular, a β-SiC lattice structure, is produced.

3. Brunauer-Emmett-Teller (BET) Surface Area, Pore Volume, and Pore Size

Figure 8:
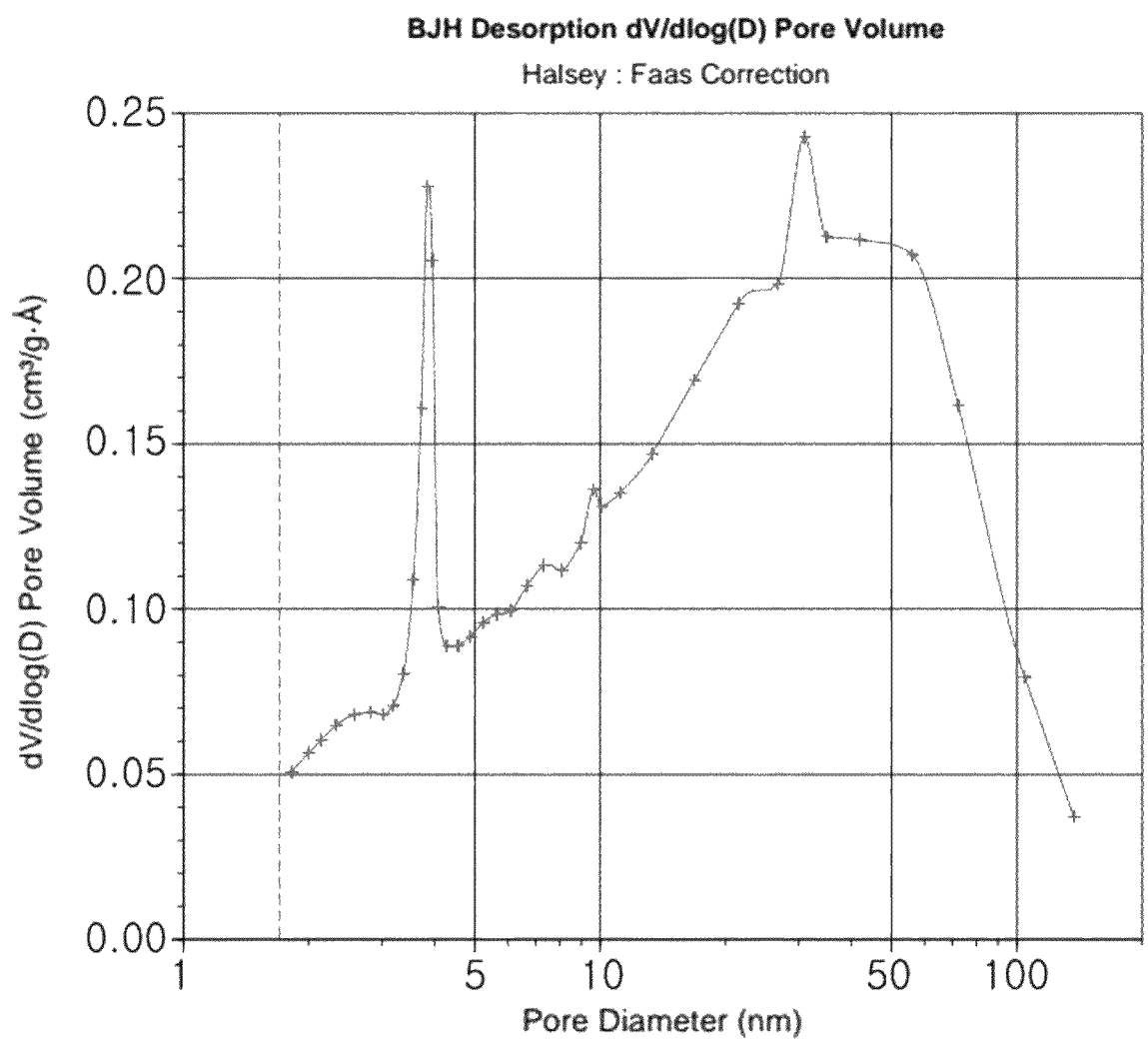
FIG. 8 is a Brunauer-Emmett-Teller (BET) curve according to an embodiment of the present invention.

BET surface areas, pore volumes, and pore sizes of the silicon carbides prepared according to Examples 1 and 2 were measured, and results thereof are shown in Table 1 below, and the pore volumes and pore sizes thereof are illustrated in FIG. 8.

At this time, the BET surface area, the pore volume, and the pore size were measured through a specific surface area and pore analyzer (Tristar II 3020, Micromeritics).

TABLE 1

|  | Surface Area (m²/g) | Pore Volume (cm³/g) | Pore Size (nm) |
| --- | --- | --- | --- |
| Example 1 | 94 | 0.2631 | 10.8181 |
| Example 2 | 119 | 0.2608 | 8.6635 |

Referring to Table 1, it can be seen that the SiCs of Examples 1 and 2 have a very high specific surface area, i.e., 94 m²/g to 119 m²/g. In addition, referring to FIG. 8, it can be confirmed that most pores have a size of 2 nm to 50 nm, which is a meso-size.

The invention claimed is:

1. A method of preparing silicon carbide, the method comprising:
   reacting a silicon-containing compound with carbon dioxide,
   wherein a reducing agent is used,
   wherein the reacting is represented by Reaction Scheme 1 or 2 or 3 below:

$4Mg+SiO2+CO2(g) \rightarrow 4MgO+SiC$, [Reaction Scheme 1]

First stage: $4Mg+SiO2 \rightarrow Mg2Si+2MgO$

Second stage: $Mg2Si+2MgO+CO2(g) \rightarrow 4MgO+SiC$, [Reaction Scheme 2]

$Mg2Si+2MgO+CO2(g) \rightarrow 4MgO+SiC$. [Reaction Scheme 3]

2. The method according to claim 1, further comprising using a heat scavenger,
   wherein the heat scavenger comprises NaCl.

3. The method according to claim 1, wherein the silicon-containing compound is amorphous silica ($SiO_2$).

4. The method according to claim 3, wherein the amorphous silica is chaff-derived silica.

5. The method according to claim 1, wherein the reacting is performed at a temperature of 1,400° C. to 1,700° C.

6. The method according to claim 1, wherein silicon carbide prepared using the method has a yield of 90% or more.

7. The method according to claim 1, further comprising post-treating silicon carbide prepared using the method.

* * * * *